United States Patent
Yang

(10) Patent No.: US 6,174,619 B1
(45) Date of Patent: Jan. 16, 2001

(54) STRUCTURE FOR POSITIONING ELECTRODE PLATES IN A BATTERY CASING

(76) Inventor: Tai-Her Yang, 6F-5, No. 250, Sec. 4, Chung Hsiao E. Rd., Taipei (TW)

( * ) Notice: Under 35 U.S.C. 154(b), the term of this patent shall be extended for 0 days.

(21) Appl. No.: 09/137,304

(22) Filed: Aug. 21, 1998

(51) Int. Cl.⁷ .................................................. H01M 2/26
(52) U.S. Cl. ..................... 429/160; 429/225; 429/100; 429/152; 429/186
(58) Field of Search .................................. 429/225, 100, 429/160, 152, 186

(56) References Cited

U.S. PATENT DOCUMENTS

| | | | |
|---|---|---|---|
| 813,582 | 2/1906 | Porter | 429/225 |
| 3,518,127 | 6/1970 | Aronson | 428/225 |

*Primary Examiner*—Maria Nuzzolillo
*Assistant Examiner*—M. Wills
(74) *Attorney, Agent, or Firm*—Bacon & Thomas, PLLC

(57) ABSTRACT

In order to improve vibration resistance of a battery, the bottoms as well as the tops of the negative and positive plates are respectively series combined. The bottoms may be combined using straps made of electrically conductive or non-conductive materials, and to facilitate integration of the bottoms of the plates into the casing, foot slots may be provided at the bottom of the battery casing for insertion of plate connectors used to connect the plates to the straps.

12 Claims, 10 Drawing Sheets

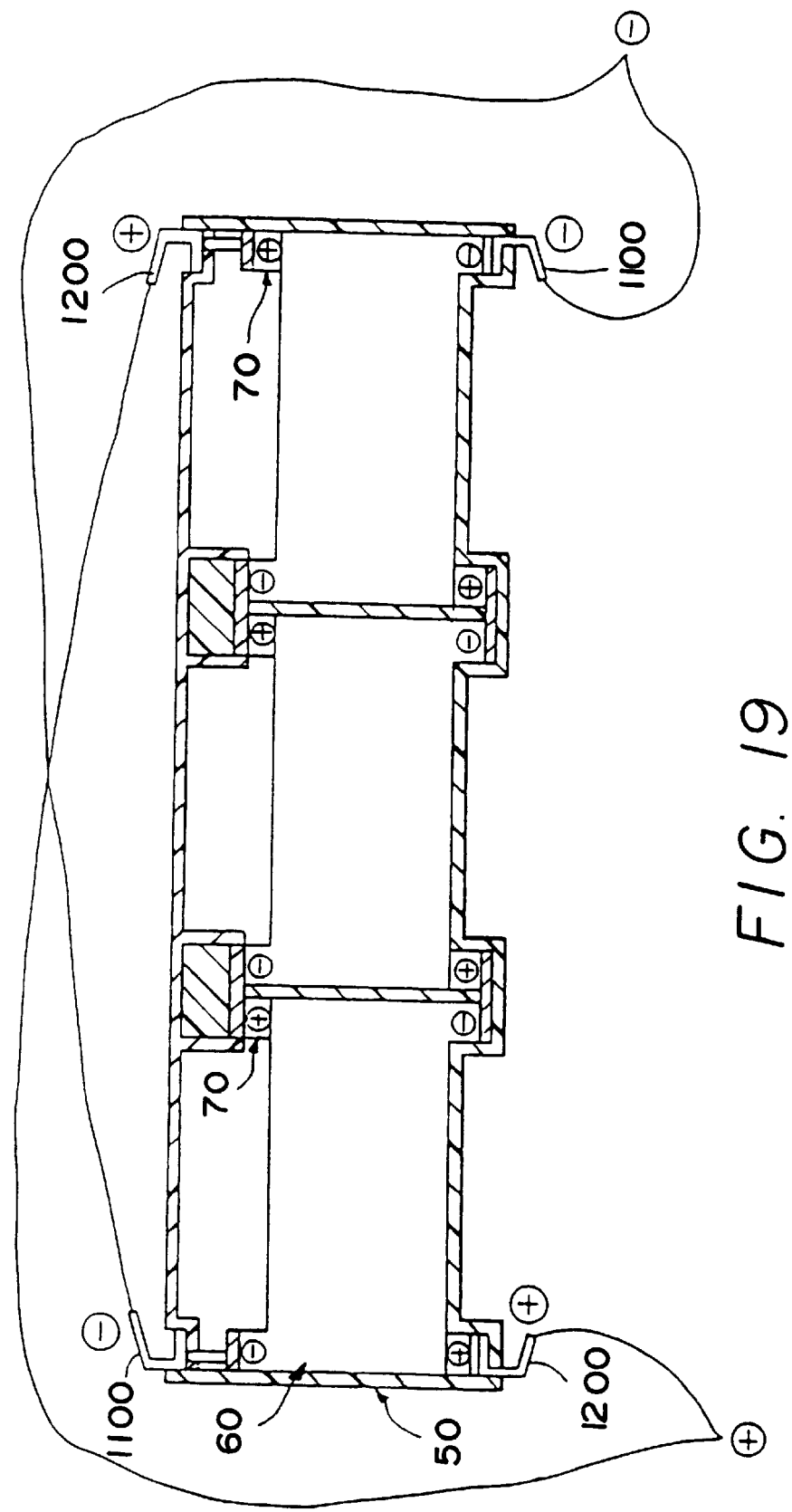

STRUCTURE FOR POSITIONING ELECTRODE PLATES IN A BATTERY CASING

BACKGROUND OF THE INVENTION (a) Field of the Invention

This invention relates to a structure for mounting battery electrode plates in a battery case, and in particular to a structure for mounting battery electrode plates in a battery case so as to prolong the operating life of the battery.

(b) Description the Prior Art

In recent years, applications of batteries have become very popular, especially after the development of motorcycles and automobiles. The lead acid battery has become an indispensable component of such vehicles. As shown in FIG. 1, the lead acid battery 10 is mainly comprised of components including a case 11, a negative plate group 12, a positive plate group 13, separators 14, electrolyte 15, and a sealing cover 16. The inside of the battery case 11 can be divided into several cell compartments 112 through partition plate 111, and each cell compartment 112 is installed with negative plates 12 and positive plates 13 which are made of lead (Pb) and lead bi-oxide ($PbO_2$) which are respectively immersed in an electrolyte 15 made of a diluted sulfuric acid ($H_2SO_4$) solution. The negative plates 12 and the positive plates 13 are separated by the separator 14 to avoid short-circuits due to mutual contact. In addition, the plate connectors 121, 123 of the positive and negative plates 12, 13 protrude upward, and the plate connectors 121 of the negative plates 12 are series combined with the negative terminal post 122, while the plate connectors 131 of the positive plates 13 are series combined with the positive terminal post 132. In addition, the negative terminal posts 122 and the positive terminal posts 132 in different cell compartments 112 can be further respectively series combined by the cell connectors 17, to respectively provide the electric terminal posts at the top of sealing cover 16, including a negative terminal post 123 and a positive terminal post 133. As long as the positive electrode wire (not shown in the figure) is connected to the positive terminal 133, and the negative electrode wire (not shown in the figure) is connected to the negative terminal 123, the lead acid battery 10 will provide an electric discharge function. The electric charge/discharge reactions are as follows:

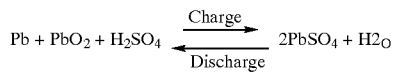

$$Pb + PbO_2 + H_2SO_4 \underset{\text{Discharge}}{\overset{\text{Charge}}{\rightleftarrows}} 2PbSO_4 + H_2O$$

Although the lead acid battery 10 has adequate electric charge/discharge functions, it is disadvantageous in that the battery case 11 is subject to resonant vibrations during charging/discharging operations. Because the negative and positive plates 12, 13 in fact are supported exclusively by the series combination of the negative terminal post 122 and the positive terminal post 132 at the top of the casing, with no series combination positioning structure being provided at the bottom, the negative and positive plates 12, 13 are not positioned in a stable manner. As a result, when a resonant vibration occurs, the negative and positive plates 12, 13 are usually vibrated at the same time, which causes the chemically-active materials to either drop off or to expand, thereby damaging the charging recoverability of the battery 10 and shortening its operating life.

SUMMARY OF THE INVENTION

The objective of the invention is to provide an improved mounting structure for mounting the battery electrode plates within the battery casing, such that the bottoms of the negative and positive plates are respectively series combined with electric conductive or non-conductive materials; thereof the for the improved combining structure between the battery electrode plates and the battery casing, beside that the bottoms of the electrode plates can be series combined with electric conductive or non-conductive materials. To facilitate integration of the bottoms of the plates into the casing, foot slots may be provided at the bottom of the battery casing for insertion of the plate connector. Through the aforesaid structural design, better positioning results for electrode plates can be obtained, and when the series combining straps are made of electric conductive material, the uniformity of electric conduction on the plate can be improved, thereby lengthening the battery operating life.

BRIEF DESCRIPTION OF THE DRAWINGS

FIG. 19 is a schematic diagram of a variation of the second preferred embodiment of the invention, illustrating multiple cell terminal connections.

DETAILED DESCRIPTION OF THE PREFERRED EMBODIMENTS

Figure 1:
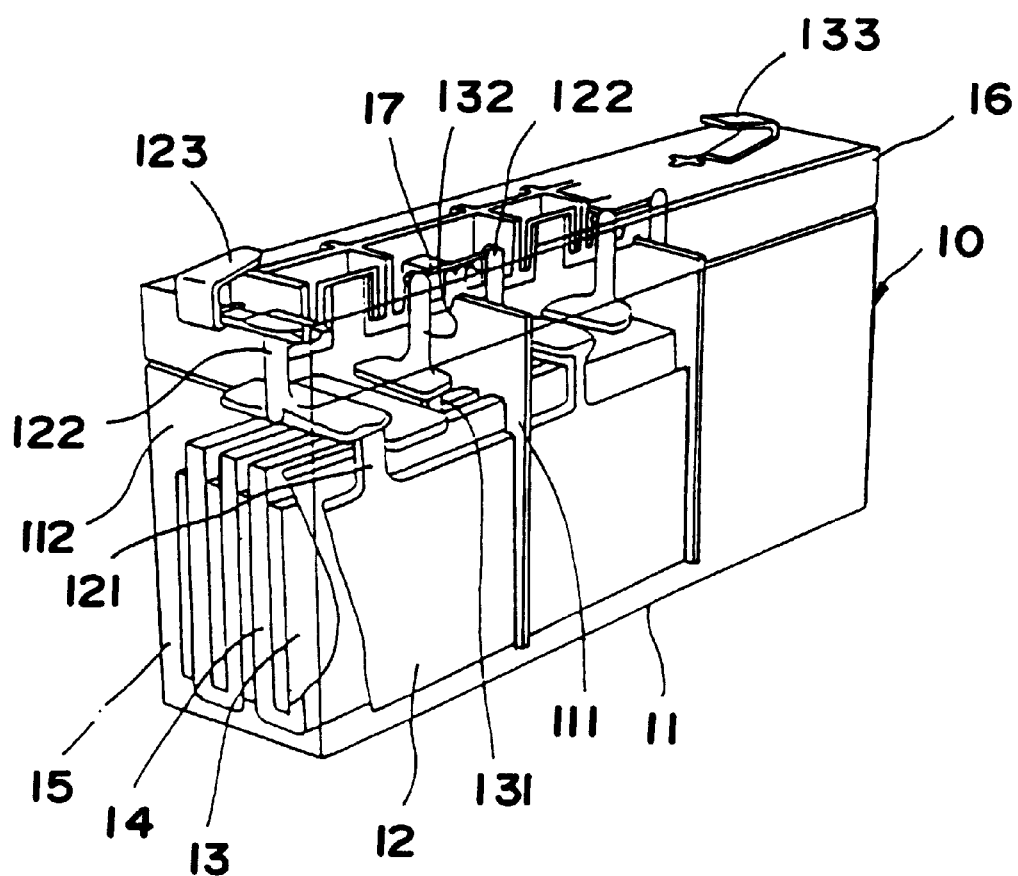
FIG. 1 is a schematic diagram of a conventional lead acid battery.
Figure 2:
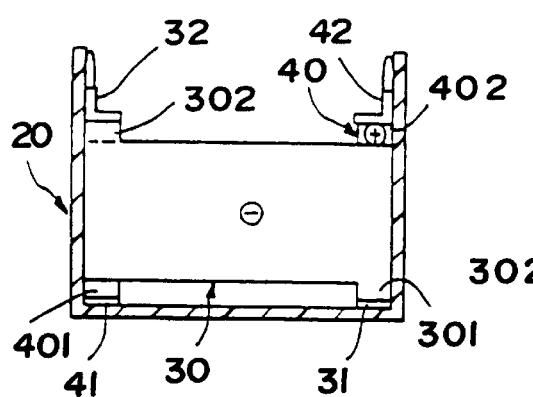
FIG. 2 is a sectional schematic diagram of a first preferred embodiment of the invention, illustrating the combination between the battery casing and a first kind of electrode plate.
Figure 3:
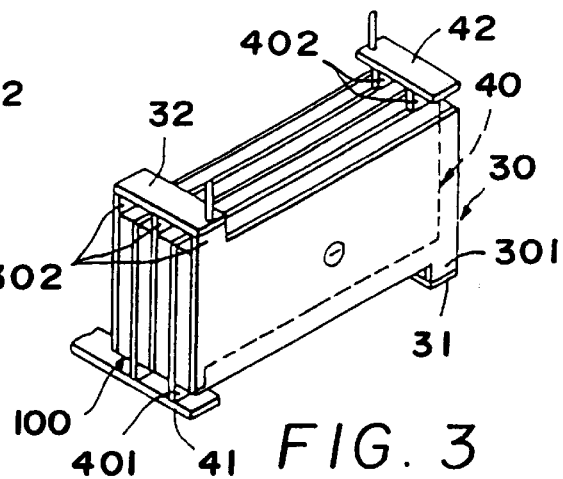
FIG. 3 is a schematic diagram of the invention illustrating the aforesaid first kind of electrode plate.

As shown in FIG. 2, the improved mounting structure of the first preferred embodiment of the invention is mainly comprised of a battery casing 20, and electrode plates including at least two negative plates 30, and at least one positive plate 40 (the illustrated embodiment includes four negative plates and three positive plates). The negative and positive plates 30, 40 are installed within the battery casing 20, which is of the same type as the conventional hollow rectangular casing open at the top. The negative and positive plates 30, 40 are alternately arranged and are mutually separated by separators 100 to avoid short circuits due to mutual contact. As shown in FIG. 3, the bottoms of the negative and positive plates 30,40 are respectively series combined by a negative electrode combining strap 31 and a positive electrode combining strap 41, made either of conductive material (such as lead, lead alloy, etc.) or non-conductive material (such as anti-corrosive plastics, etc.), arranged to positively position the bottoms of the negative and positive plates 30, 40. As shown in FIGS. 2 and 3, two plate connectors 301, 302, 401, 402 are respectively symmetrically formed at the two diagonal corners of the negative and positive plates 30, 40, which cause the said negative and positive plates 30, 40 to appear to have a "⊿" shaped structure. As a result, the negative and positive plates 30, 40 can be welded through their bottom plate connectors 301, 401 to respective negative and positive electrode combining straps 31, 32, while the top plate connectors 302, 402 can be series connected to the negative terminal post 32 and positive terminal post 42.

Figure 4:
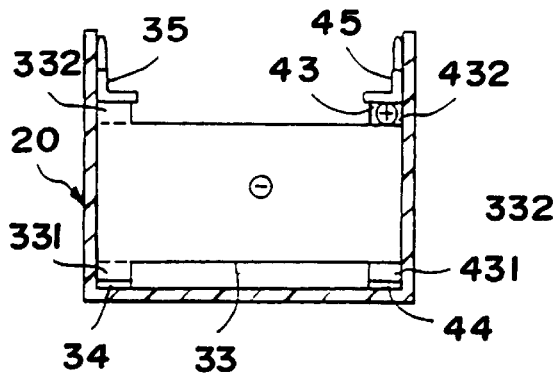
FIG. 4 is a sectional schematic diagram of a variation of the first preferred embodiment of the invention, illustrating the combination between the battery casing and a second kind of electrode plate.
Figure 5:
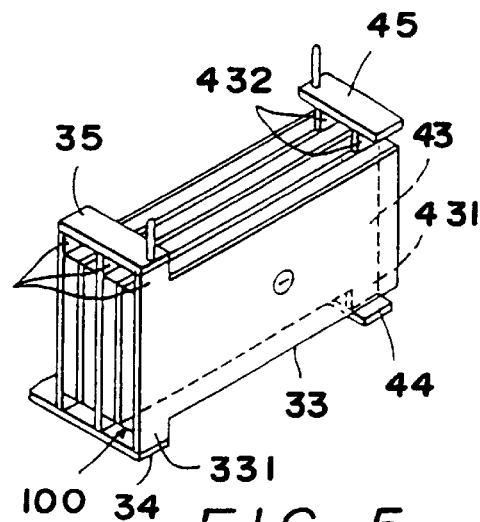
FIG. 5 is a schematic diagram of the invention illustrating the aforesaid second kind of electrode plate.

An alternative design of the negative and positive plates is shown in FIGS. 4 and 5. In this design, the negative and positive plates 33, 43 also have bottom and top plate connectors 331, 332, 431, 432, but the plate connectors are formed at the top and bottom ends of one side of the negative and positive plates 33, 43, which cause said negative and positive plates 33, 43 to appear to have a "T" shaped structure. The bottom plate connectors 331, 431 are again respectively welded to the negative and positive electrode combining straps 34, 44 made of electric conductive and non-conductive materials, while the top plate connectors 332,432 are series connected to the negative terminal post 35 and positive terminal post 45.

Figure 6:
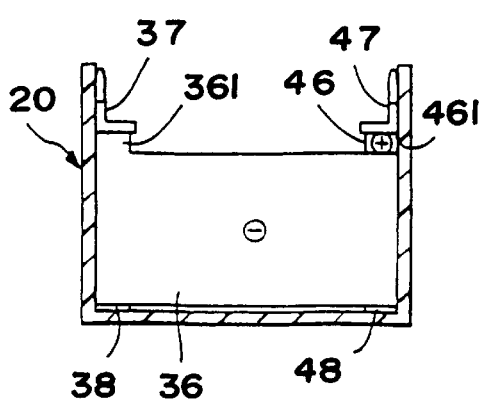
FIG. 6 is a sectional schematic of a variation of the first preferred embodiment of the invention, illustrating the combination between the battery casing and a third kind of electrode plate.
Figure 7:
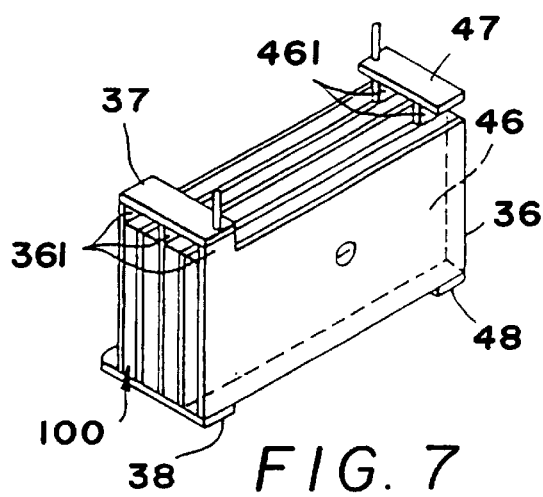
FIG. 7 is a schematic diagram of the invention illustrating the aforesaid third kind of electrode plate.

As shown in FIGS. 6 and 7, in yet another kind of structural design for the negative and positive plates 36, 46, each of the negative and positive plates has only one plate connector 361, 461 respectively, and the plate connectors 361, 461 protrude upwardly. Consequently, they can be series connected to the negative terminal post 37 and the positive terminal post 47 and, further, the bottoms of the negative and positive plates 36, 46 can be respectively welded with negative and positive electrodes combining straps 38, 48 made of electric conductive or non-conductive materials to improve the positioning of the plates.

It is worth mentioning that when the negative electrode combining straps 31, 34, 38 and the positive electrode combining straps 41, 44, 48 are made of non-conductive material, the integrated positioning effects of the negative and positive plates 30, 33, 36, 40, 43, 46 are improved, thereby avoiding generation of resonant vibrations during the electric charging/discharging process which cause drop off or expanded growth of the chemically-active materials on the plates, resulting in prolonged battery operating life. When the negative electrode combining straps 31, 34, 38 and positive electrode combining straps 41, 44, 48 are made of conductive material, in addition to providing better positioning of the aforesaid negative and positive plates, better uniformity of electric conduction on the aforesaid negative and positive plates is obtained, reducing the internal resistance of the aforesaid negative and positive plates, and increasing the battery discharge capacity.

Regarding the series combination methods, the positive electrode combining straps 41, 44, 48 are series combined at the bottoms of the positive plates 40, 43, 46 while the bottoms of the negative plates 30, 33, 36 are not series combined, or the negative and positive electrode combining straps 31, 34, 38, 41, 44, 48 are respectively series combined with the bottoms of the negative and positive plates 30, 33, 36, 40, 43, 46; or the negative electrode combining straps 31, 34, 38 are series combined at the bottoms of the negative plates 30, 33, 36 while the bottoms of the positive plates 40, 43, 46 are not series combined.

Figure 8:
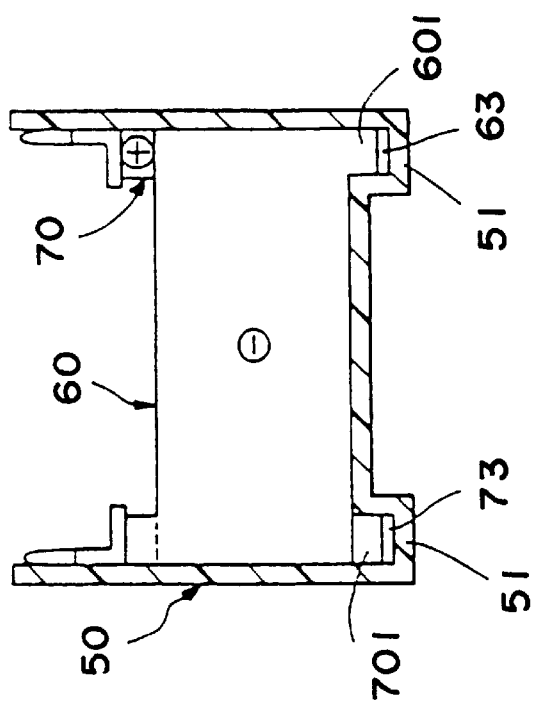
FIG. 8 is a sectional schematic diagram of a second preferred embodiment of the invention, illustrating a combination between the variation of the first kind of battery casing and the first kind of electrode plate.
Figure 9:
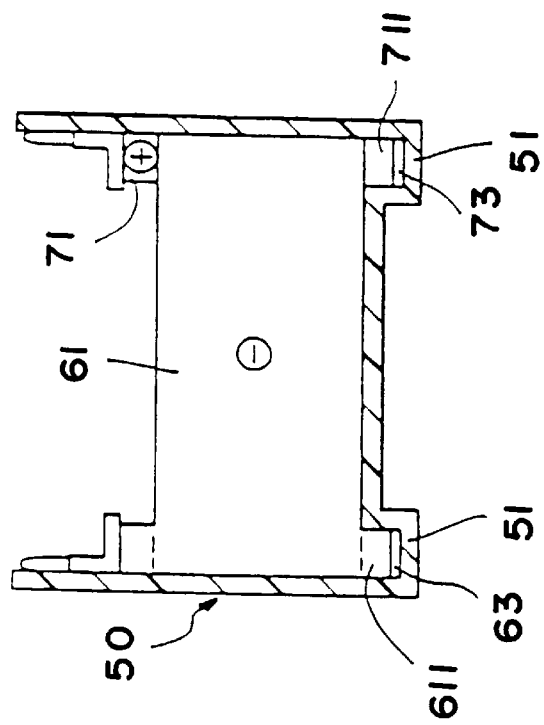
FIG. 9 is a sectional schematic diagram of a variation of the second preferred embodiment of the invention, illustrating a combination between the variation of the first kind of battery casing and the second kind of electrode plate.
Figure 10:
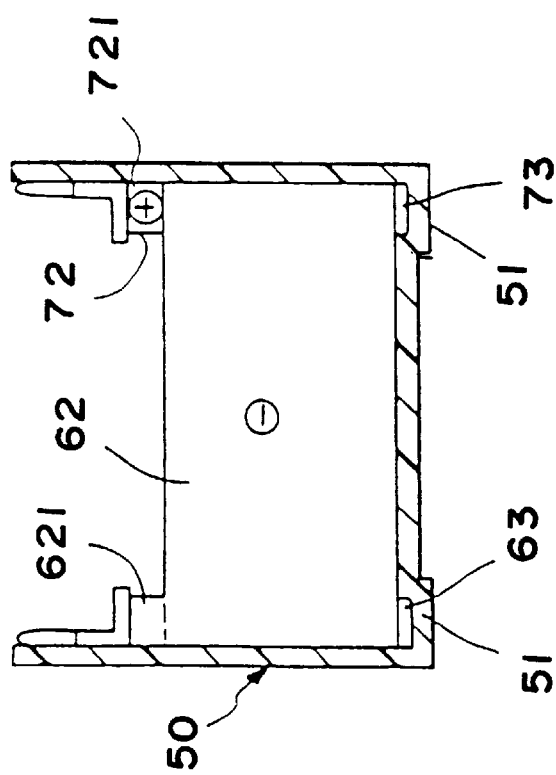
FIG. 10 is a sectional schematic diagram of a variation of the second preferred embodiment of the invention, illustrating a combination between the variation of the first kind of battery casing and the third kind of electrode plate.

A second preferred embodiment of the invention having an improved mounting structure between the electrode plates and the battery casing is illustrated in FIGS. 8, 9 and 10. In this embodiment, each bottom of the two sides of the battery casing 50 is installed with a foot slot 51, but the structural designs of the negative and positive plates 60, 70 are the same as in the first preferred embodiment, i.e., the second preferred embodiment also includes three types of structural designs for the negative and positive plates 60, 70, 61, 71, 62, 72, with the bottoms of the plates again being respectively series welded to the negative electrodes combining strap 63 and the positive electrodes combining strap 73 made of electric conductive or non-conductive materials. The bottom plate connectors 601, 611, 701, 711 of the negative and positive plates 60, 61, 70, 71 and the negative and positive electrode series combining straps 63, 73 are inserted in the foot slots 51, so that the bottoms of the negative and positive plates 60, 61, 70, 71 are combined with the battery casing 50 to improve the positioning effect. For the negative and positive plates 62, 72 which have only single plate connectors 621, 721, the bottom negative and positive electrode series combining straps 63, 73 can be inserted in the foot slots 51, and as a result, the positioning effects of the negative and positive plates 62, 72 can be improved.

Figure 11:
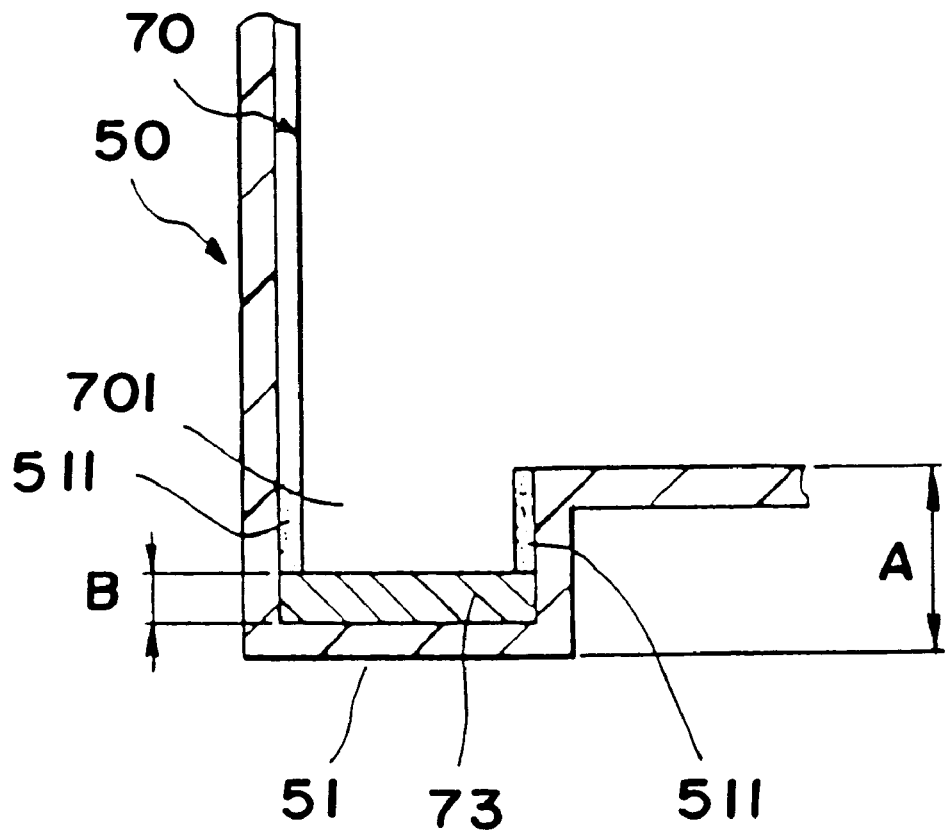
FIG. 11 is a sectional schematic diagram of a variation of the second referred embodiment of the invention, illustrating a combination between a first kind of battery casing foot slot and the electrode plates.

FIG. 11 shows the optimum condition for the bottom plate connectors 601, 611, 701, 711 of the negative and positive plates 60, 61, 70, 71 inserted into the foot slots 51 of the battery casing 50 (this figure only shows, by way of illustration, the case in which the bottom plate connector 701 of the positive plate 70 is inserted into the foot slot 51). The foot slot height "A" is more than 7 mm, the welding depth B of the positive electrode combining strap 73 is 2–3 mm, when the insertion is done, and the foot slot 51 is filled with epoxy resin or acid solution. The epoxy resin is filled in the space 511 between the foot slot 51 and the plate connector 701 to avoid acid drop off from the positive plate 70, and to eliminate the possibility of lack-acid on the plate, while the filled-up acid solution maintains the adequate "acid remains" between the battery casing 50 and the electrode plates so as to provide a good charging recoverability and to prolong the battery operating life.

Figure 12:
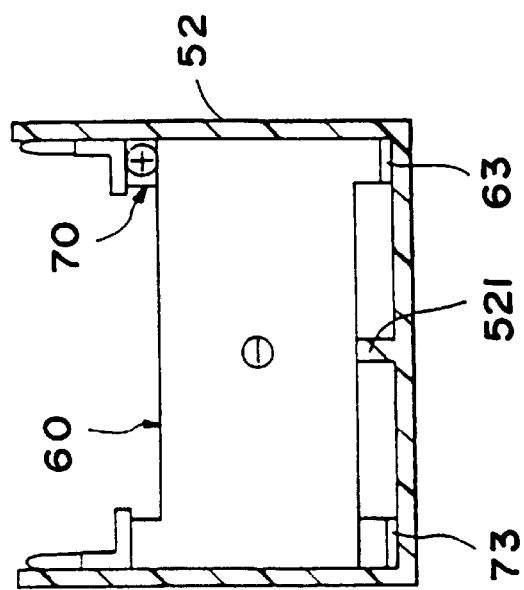
FIG. 12 is a sectional schematic diagram of a variation of the second preferred embodiment of the invention, illustrating a combination between a second kind of battery casing and the first kind of electrode plate.
Figure 13:
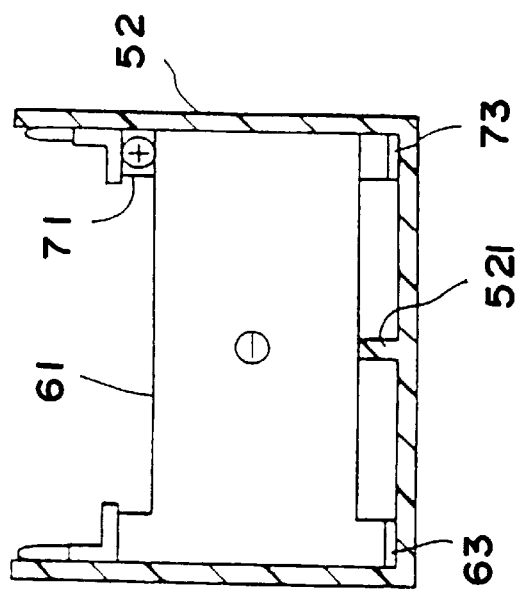
FIG. 13 is a sectional schematic diagram of a variation of the second preferred embodiment of the invention, illustrating a combination between the second kind of battery casing and the second kind of electrode plate.
Figure 14:
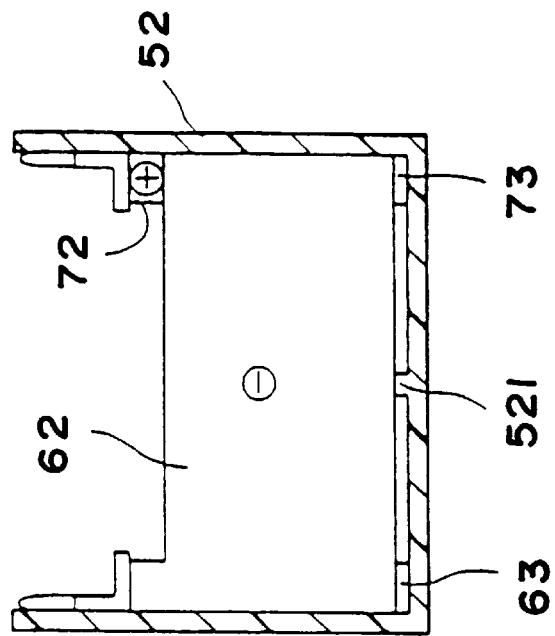
FIG. 14 is a sectional schematic diagram of a variation of the second preferred embodiment of the invention, illustrating the combination between the second kind of battery casing and the third kind of electrode plate.

As is further shown in FIGS. 12, 13 and 14, the battery casing 52 may be of another different structural design, in which the bottom of the battery casing 52 is installed with a protruding support post 521. Hence, when the negative and positive plates 60, 61, 62, 70, 71, 72 are respectively installed into the battery casing 52, the support post 521 can support the bottoms of the negative and positive plates to improve positioning of the negative and positive plates, and lengthen the battery operating life.

Figure 15:
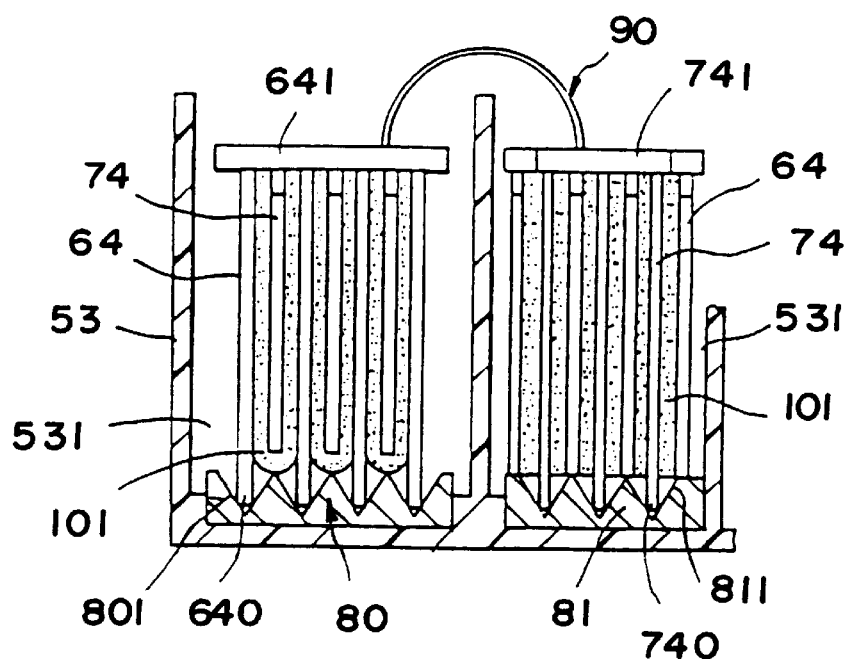
FIG. 15 is a sectional schematic diagram of a variation of the second preferred embodiment of the invention, illustrating the combination between a fourth kind of battery casing and electrode plate.

As is further shown in FIG. 15, which is a schematic diagram of another battery casing 53 and the negative and positive plates 64,74, the bottom of each cell compartment 531 of the battery casing 53 may be installed with negative and positive electrode combining straps 80, 81, and several "V" shaped slots 801, 811 provided on the straps for insertion of the plate connectors 640, 740 at the bottom of the negative and positive plates 64, 74. Further, the negative and positive plates 64, 74 are separated by the separators 101, while the negative and positive electrode combining straps 80, 81 are made of electric conductive or non-conductive materials, and can be independently inserted into the battery casing 53, or can be integrally manufactured, such as by plastic injection methods, with the battery casing 53. In addition, the negative and positive terminal posts 641, 741 on the tops of the negative and positive plates 64, 74 in different cell compartments 531 are series combined with an electrically conducting foil 90 for passing electric current.

Figure 16:
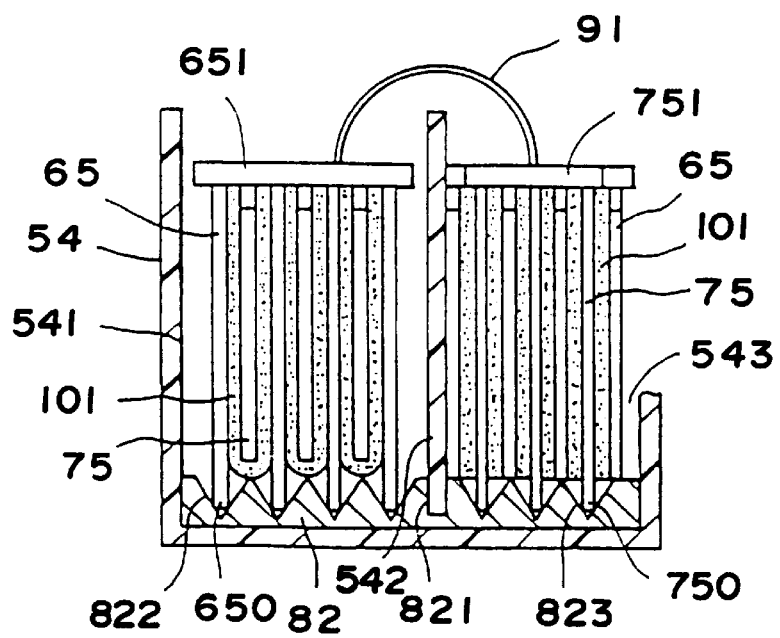
FIG. 16 is a sectional schematic diagram of a variation of the second preferred embodiment of the invention, illustrating the combination between a fifth kind of battery casing and electrode plate.

As is further shown in FIG. 16, the series combining strap 81 is first installed at the bottom of the large cell compartment 541 in another battery casing 54. The middle of the series combining strap 82 is provided with an insert slot 821 for insertion of a separator 542, and the large cell compartment 541 is divided into two smaller cell compartments 543. Furthermore, two sides of the middle insert slot 821 of the series combining strap 82 are further installed with several insert slots 822, 823 for insertion of the bottom plate connectors 650, 750 of the negative and positive plates 65, 75. The series combining strap 82 is made of conductive material and has the effect of series combining the negative and positive plates 65, 75. Of course, the negative and positive terminal posts 651, 751 at the tops of the negative and positive plates 65, 75 are also series combined by an electric conducting foil 91.

Figure 17:
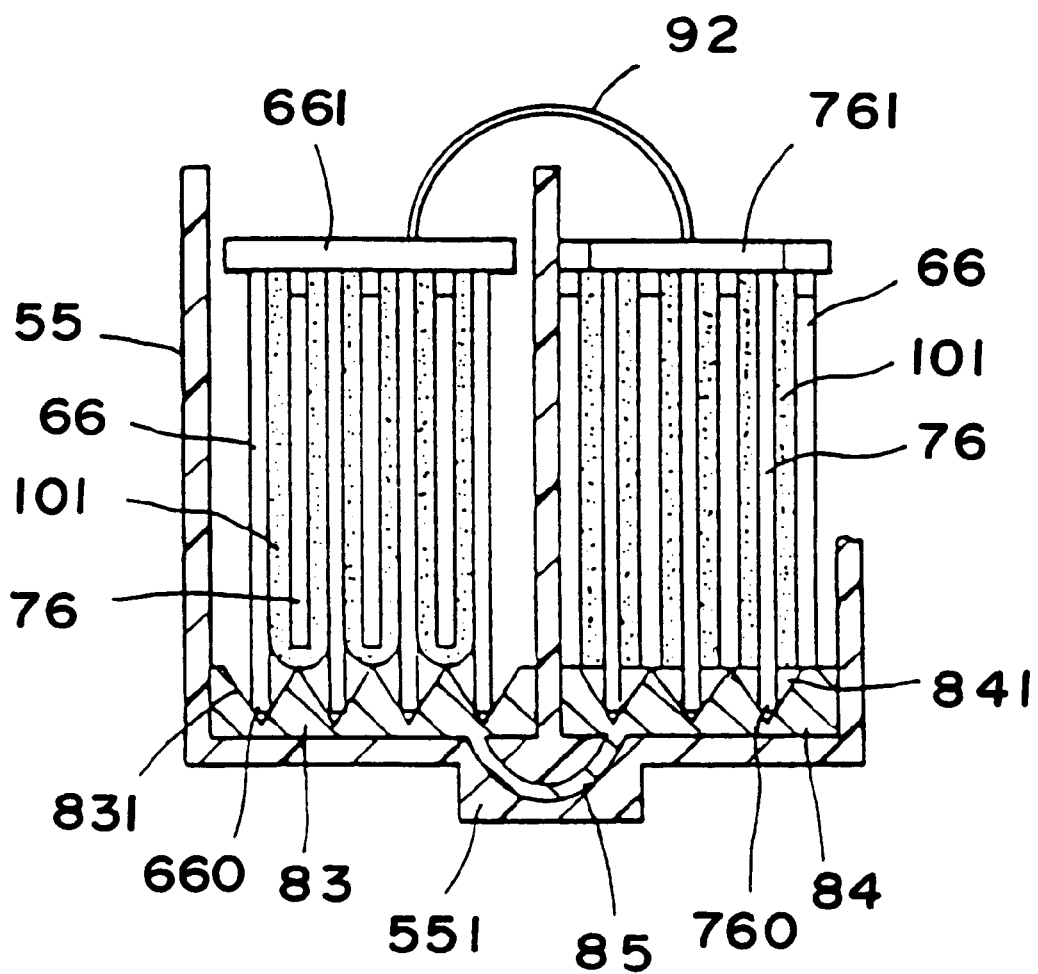
FIG. 17 is a sectional schematic diagram of a variation of the second embodiment of the invention illustrating the combination between a sixth kind of battery casing and electrode plate.

Furthermore, as is shown in FIG. 17, to allow for electric conduction between the two independent separated negative and positive series combining straps 83, 84, the bottom of the battery casing 55 can be installed with a slot 551 for introducing the electric conducting foil 85, which connects the negative and positive series combining straps 83, 84. In addition, the series combining straps 83, 84 are also respectively installed with slots 831, 841 for insertion of the bottom plate connectors 660, 760 of the negative and positive plates 66, 76, and of course, the respective top plate connectors 661, 761 of the negative and positive plates 66, 76 are also series combined using an electric conducting foil 92.

Figure 18:
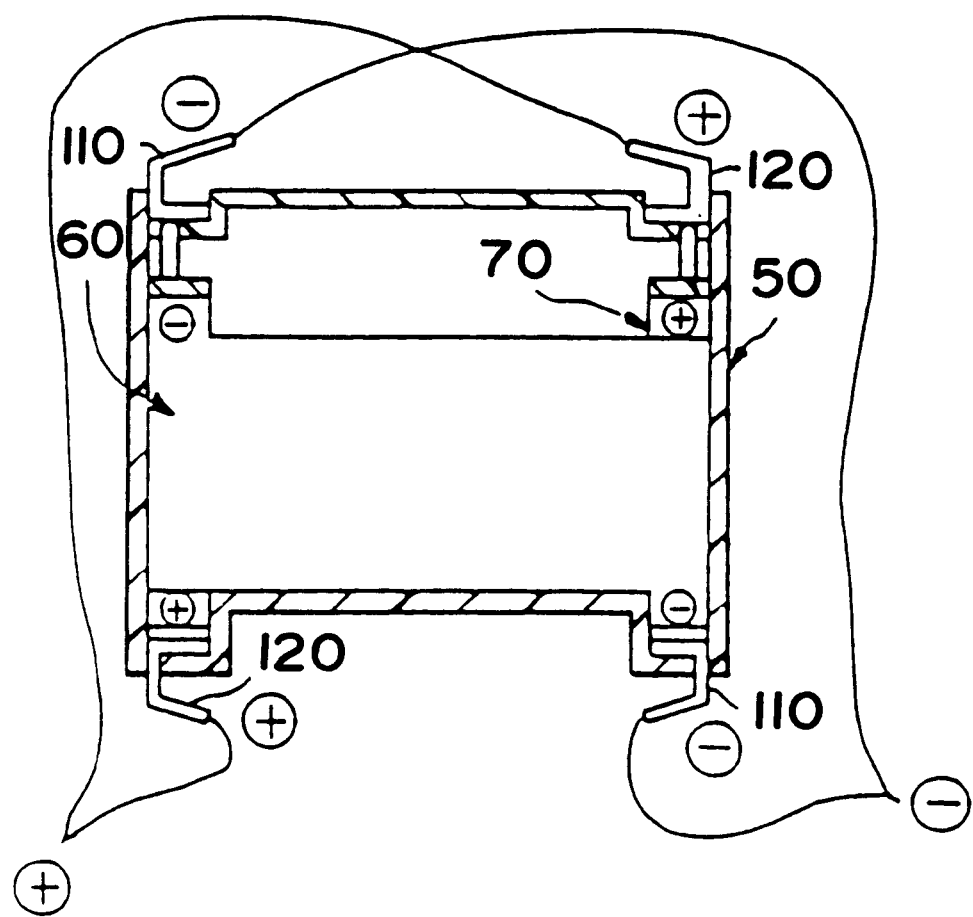
FIG. 18 is a schematic diagram of a variation of the second preferred embodiment of the invention, illustrating terminal connections of a single cell compartment.

Finally, it is further shown in FIG. 18 that, for a single cell battery, the tops and bottoms of the negative and positive plates 60, 70 of the battery casing 50 are extended to provide power output terminals 110, 120, and the extended terminals 110, 120 at the tops and bottoms of the electrode plates 60, 70 having the same polarity are all arranged in positive to positive and negative to negative combinations to supply power. For a multiple cell battery, the polarities of the negative and positive plates 60, 70 between the cells are mutually series combined, and the top and bottom terminal posts of the said negative and positive electrode plates 60, 70 are all extended to provide a pair of positive and negative power output terminals 1100, 1200. The two terminals 1100, 1200 provide positive to positive and negative to negative combinations to supply power simultaneously to reduce the internal resistance of the electrode plates.

The achievable effects and advantages of the invention are further described as follows:

1. Regarding the improved structures of the battery electrode plates:
    (i) In the invention, the bottoms of the negative and positive plates 30, 33, 36, 40, 43, 46 are respectively series combined through series combining straps 31, 34, 38, 41, 44, 48 made of non-conductive or conductive materials, so that the bottoms of the aforesaid plates are positively positioned, the more integrated positioning effect of the electrode plates having the effect of avoiding resonant vibrations to reduce drop-offs of the chemically-active materials or expanded growth, resulting in greater battery efficiency and the advantage of prolonging the battery operating life.
    (ii) When the series combining straps 31, 34, 38, 41, 44, 48 are made of electric conductive material, in addition to better electrode plate positioning, the electric conduction uniformity of the electrode plates is improved, and thus not only the internal resistance of the aforesaid electrode plates can be reduced, but the effect and advantage of increasing the battery discharge capacity also can be obtained.
2. Regarding the improved combining structure between the battery electrode plates and the battery casing:
    (i) In the invention, besides merely series combining the bottoms of the negative and positive plates through the series combining straps to improve positioning, the bottom side of the battery casing 50 can be also installed with foot slots 51 for inserting the plate connectors 601, 611, 701, 711 of the negative and positive plates 60, 61, 70, 71 and the series combining straps 63, 67, to further improve positioning of the bottoms of the negative and positive plates 60, 61, 62, 70, 71, 72. Furthermore, the foot slots 51 can be filled in with epoxy resin or acid solution to retain adequate "acid remnants" in the battery casing 50, thereby providing the effect and advantage of maintaining good charging recoverability of the battery.
    (ii) In the invention, the bottom of the battery casing 52 can also be installed with a protruding support post 521 to support the aforesaid negative and positive plates and thereby improve the positioning effect of the aforesaid electrode plates and prolong the operating life of the battery.
3. When the series combining straps 63, 73 are made of electric conductive material, besides improving the positioning effect of the negative and positive plates 60, 61, 62, 70, 71, 72, the internal resistance of the aforesaid electrode plates can be also reduced, and furthermore, the effect and advantage of increasing battery discharging capacity are obtained.

4. In the invention, the bottoms of the battery casings 53, 54, 55 can be directly series combined with the series combining straps 80, 81, 82, 83, and inserting slots 801, 811, 822, 823, 833, 834 can be further installed on the series combining straps for insertion of the negative and positive plates 64, 74, 65, 75, 66, 76, thereby improving positioning of the aforesaid electrode plates, and providing the effect and advantage of increasing the battery operating life.

5. When the series combining straps 80, 81, 82, 83 are made of electric conductive material, besides improving positioning of the negative and positive plates 64, 74, 65, 75, 66, 76, internal resistance of the aforesaid electrode plates is also reduced, thereby obtaining the effect and advantage of increasing the battery discharging capacity.

The above disclosed illustrations are only two examples of the invention. Any equivalent modifications or changes that might occur to those familiar with the art of the invention also are intended to be included within the scope of the invention.

I claim:

1. An improved battery electrode plate structure, comprising:

at least two positive electrode plates forming a positive group of electrode plates;

at least two negative electrode plates forming a negative group of electrode plates; and at least one strap arranged to respectively series connect bottoms of the electrode plates in at least one of said positive and negative groups of electrode plates, wherein said straps are positioned at a bottom of a battery casing, wherein said electrode plates are mutually separated by separating members arranged to prevent mutual short circuits between the plates, and wherein said straps are made of a nonconductive material.

2. An improved battery electrode plate structure as claimed in claim 1, wherein the bottoms of the positive electrode plates are series combined and the bottoms of the negative electrode plates are not series combined.

3. An improved battery electrode plate structure as claimed in claim 1, wherein the bottoms of the positive electrode plates and the bottoms of the negative electrode plates are all respectively series combined.

4. An improved battery electrode plate structure as claimed in claim 1, further comprising plate connectors extending from respective said negative and positive electrode plates for connecting said negative and positive electrode plates to said straps.

5. An improved battery electrode plate structure as claimed in claim 4, wherein the bottom of the battery casing includes at least one foot slot for insertion of bottom ones of said plate connectors.

6. An improved battery electrode plate structure as claimed in claim 4, further comprising support posts extending upwards from the bottom of the battery casing to further support said negative and positive electrode plates within said battery casing.

7. An improved battery electrode plate structure as claimed in claim 5, wherein said foot slots are filled with an epoxy resin to fill a space between the slots and the plate connectors, whereby said epoxy resin prevents acid drop-off from the electrode plates.

8. An improved battery electrode plate structure as claimed in claim 5, wherein said foot slots are filled with an acid solution to fill a space between the slots and the plate connectors, whereby said acid solution maintains an adequate acid remnant between the battery casing and the electrode plate to provide improved charging recovery.

9. An improved battery electrode plate structure as claimed in claim 4, wherein said plate connectors are formed in pairs, one each at an opposite diagonal corner of respective electrode plates.

10. An improved battery electrode plate structure as claimed in claim 4, wherein each electrode plate includes only a single one of said plate connectors.

11. An improved battery electrode plate structure as claimed in claim 1, wherein for a single cell compartment battery, the tops and bottoms of said negative and positive electrode plates are installed with extended power output terminals, and the top and bottom power output terminals of the electrode plates of the same polarity are arranged in positive-to-positive and negative-to-negative combinations.

12. An improved battery electrode plate structure as claimed in claim 1, wherein for a battery having multiple cell compartments, plates of negative and positive polarities between the cells are mutually series combined, the tops and bottoms of said negative and positive electrode plates are installed with extended power output terminals, and the top and bottom power output terminals of the electrode plates of the same polarity are arranged in positive-to-positive and negative-to-negative combinations.

\* \* \* \* \*